United States Patent
Arora et al.

(10) Patent No.: US 9,261,938 B2
(45) Date of Patent: Feb. 16, 2016

(54) CONTROLLING ENERGY CONSUMPTION OF AN ELECTRONIC DEVICE IN RESPONSE TO AVAILABILITY OF AN ENERGY SOURCE

(71) Applicant: Advanced Micro Devices, Inc., Sunnyvale, CA (US)

(72) Inventors: Manish Arora, Dublin, CA (US); Vignesh Trichy Ravi, Austin, TX (US); Indrani Paul, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/333,976

(22) Filed: Jul. 17, 2014

(65) Prior Publication Data

US 2016/0018870 A1    Jan. 21, 2016

(51) Int. Cl.
*G06F 1/32* (2006.01)

(52) U.S. Cl.
CPC ............ *G06F 1/3212* (2013.01); *G06F 1/3296* (2013.01)

(58) Field of Classification Search
None
See application file for complete search history.

(56) References Cited

U.S. PATENT DOCUMENTS

| | | | |
|---|---|---|---|
| 2008/0268874 A1* | 10/2008 | Pizzi | 455/456.6 |
| 2009/0033277 A1* | 2/2009 | Ludtke | 320/106 |
| 2012/0272077 A1* | 10/2012 | Dow et al. | 713/310 |
| 2012/0324259 A1* | 12/2012 | Aasheim et al. | 713/320 |
| 2015/0069969 A1* | 3/2015 | Wu et al. | 320/109 |

* cited by examiner

*Primary Examiner* — Joseph Schoenholtz
(74) *Attorney, Agent, or Firm* — Faegre Baker Daniels LLP

(57) ABSTRACT

An apparatus and methods for controlling energy consumption of an electronic device determine an availability of an energy source to provide energy to the electronic device. The apparatus and methods control, by power management control logic of the electronic device, energy consumption of the electronic device in response to determining the availability of the energy source.

19 Claims, 5 Drawing Sheets

CONTROLLING ENERGY CONSUMPTION OF AN ELECTRONIC DEVICE IN RESPONSE TO AVAILABILITY OF AN ENERGY SOURCE

BACKGROUND OF THE DISCLOSURE

The disclosure relates generally to electronic devices and more particularly to methods and apparatus for controlling energy consumption of an electronic device.

Runtime management solutions that control energy consumption are used in electronic devices in an attempt to assist in managing battery capacity of the electronic devices. Some existing solutions cause the electronic device to consume less energy when the battery level is low. Thus, an existing solution may reduce the activity of clients and/or applications running on the electronic device when the battery level drops below a certain percentage, with 100 percent corresponding to a fully-charged battery. This solution may turn off animations, vibrations of the electronic device that would otherwise occur in cases such as receipt of an incoming call, and dim the display screen of the electronic device. Another solution reduces or limits the performance state ("P-State") of a central processing unit (CPU) by limiting the CPU operating frequency and/or voltage in response to a low battery level or a thermal emergency.

Additional known solutions control activity initiated by a server. The server is made aware of an electronic device's residual battery level, estimated rate of energy consumption, and/or thermal information to make decisions regarding the features and/or quality of content to push to the electronic device. When the electronic device's battery level is low, advanced features can be disabled, quality of pushed content can be degraded, and/or the server may cause some computing functions to be shifted from the electronic device to the server. In some cases, the electronic device is also able to control shifting of computing functions to the server.

Reducing activity of clients and/or applications running on an electronic device, turning features off, reducing or limiting a P-state of an electronic device, disabling advanced features, and shifting computing operations to a server each degrade the experience of a user of the electronic device. While battery size may be increased and processing cores with lower power specifications, such as lower-power CPU cores, may be used in an effort to combat these problems, these approaches are unacceptable in devices with certain size and profile requirements and in devices that require the ability to support certain advanced applications and features.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
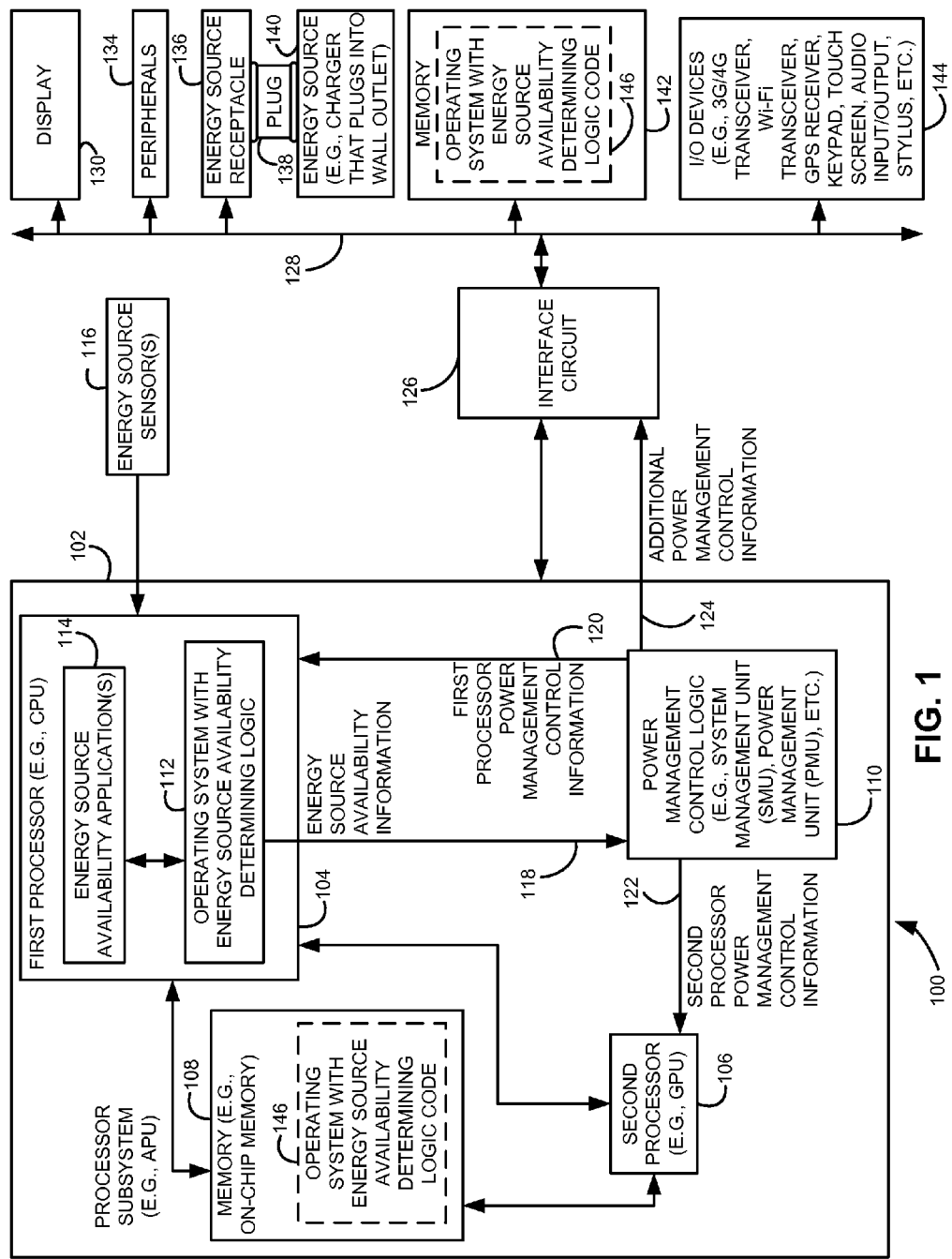
FIG. 1 is a functional block diagram illustrating an example electronic device including energy source availability determining logic and further illustrating a connectivity of the electronic device to an energy source.

Briefly, methods and apparatus for controlling energy consumption of an electronic device (e.g., a mobile or smart phone, a phablet, a tablet, a laptop computer, portable media player, or any other suitable device which requires replenishment of energy, such as any suitable battery-equipped device) are disclosed. In one embodiment, a method and an apparatus (e.g., a processor such as a CPU executing an operating system) control energy consumption of an electronic device based on an availability to provide energy to the electronic device (e.g., the expected availability to recharge the battery). The method and apparatus may determine the availability of an energy source (e.g., a battery charger) to provide the energy to the electronic device and may control the energy consumption of the electronic device before the energy is provided to the electronic device (e.g., before the electronic device is connected to the battery charger) in response to determining the availability of the energy source.

Among other advantages, for example, the disclosed methods and apparatus allow use of information regarding the availability of an energy source to control operation (e.g., energy consumption) of an electronic device. As a result, for example, whereas existing solutions reduce the activity of clients and/or applications running on the electronic device when the battery level drops below a certain percentage, the disclosed methods and apparatus may avoid doing so when it is determined that an energy source is or is expected to be readily available. Additionally, the need to make a server aware of, for example, an occurrence of a low battery situation may be avoided; the need for the server to reduce the quality of content provided to the electronic device may be avoided; and the need to shift computing functions from the electronic device to the server may be avoided. Other advantages will be recognized by one of ordinary skill in the art.

In one example, the electronic device may include at least one of an accelerated processing unit (APU), a central processing unit (CPU), a graphics processing unit (GPU), and display logic for a display. The methods and apparatus may control energy consumption of one or more of the APU, CPU, GPU, and/or display logic.

In another example, the methods and apparatus may determine the availability (e.g., expected availability) of the energy source to provide energy to the electronic device by determining a location of the electronic device, for example using a Global Positioning System (GPS) receiver of the electronic device, and by determining the availability of the energy source based on the determined location or a communicated signal (e.g., a signal transmitted, perhaps wirelessly, from a charging station to the electronic device). Additionally or alternatively, the methods and apparatus may determine the availability of the energy source to provide energy to the electronic device by determining a history of providing energy to the electronic device. For example, the methods and apparatus may determine a charging history of the electronic device, which may include indications of locations where the electronic device has been charged. The methods and apparatus may use the charging history and a current location of the electronic device to predict or determine the proximity of the electronic device to the energy source at a particular time in order to determine the availability of the energy source. For example, the methods and apparatus may compare the current location of the electronic device to the locations where the electronic device has been charged.

In yet another example, determining the availability of the energy source includes determining the availability based on at least one of a current energy level of the electronic device, user activity information indicative of a predicted or actual proximity of the electronic device to the energy source based on predicted activity of a user of the electronic device, and sharing information regarding sharing of the energy source between the electronic device and another electronic device. For example, with two electronic devices sharing the same charger, the electronic device with a lower amount of battery may be given first priority (e.g., allowed to use the charger first). At least one of the electronic devices may be involved in determining the order in which the electronic devices are to use the charger.

In another example, the electronic device includes an energy source sensor that detects proximity to the energy source. The methods and apparatus may determine the availability of the energy source to provide energy based on the detected proximity to the energy source.

In still another example, the methods and apparatus may control energy consumption of the electronic device in response to determining the availability of the energy source by at least one of controlling the electronic device to consume energy at a rate greater than a rate at which the electronic device is otherwise configured (e.g., without use of the methods and/or apparatus described herein) to consume energy when energy consumption is to be reduced, and controlling the electronic device to consume energy at a rate lesser than a rate at which the electronic device is otherwise configured to consume energy when energy consumption is to be reduced. For example, the electronic device may consume energy at a lesser rate if the methods and apparatus predict that the electronic device will not be in proximity to the charger and able to use the charger for a significant period of time. Conversely, the electronic device may consume energy at a greater rate if the methods and apparatus predict that the electronic device will be in proximity to the charger and able to use the charger in a relatively short period of time.

In another example, the methods and apparatus may cause the electronic device to issue at least one of: (i) a notification to a user of the electronic device that the user is to use the energy source to provide the energy to the electronic device, and (ii) a notification to the user that the user is to transport the energy source with the electronic device to provide the energy to the electronic device at a subsequent time.

Among other advantages, the methods and apparatus provide a way to determine an expected availability of an energy source to provide energy to an electronic device, and control energy consumption of the electronic device in response to determining the expected availability of the energy source. For example, it may be determined that the electronic device is close to, or is expected to soon be close to, an energy source that is available for use, so the disclosed methods and apparatus may not reduce the activity of clients and/or applications running on the electronic device. Depending upon the computational resources required, the disclosed methods and apparatus may even increase a rate of energy consumption of the electronic device in a situation where the electronic device is close to or is expected to soon be close to an available energy source. The methods and apparatus may also, for example, account for sharing of the energy source among more than one electronic device and control power consumption of each of the electronic devices that is to share the energy source. Other advantages of the subject matter disclosed herein will be recognized by those of ordinary skill in the art.

FIG. 1 is a functional block diagram illustrating an example electronic device 100 including energy source availability determining logic and further illustrating a connectivity of the electronic device 100 to an energy source as described below. The electronic device 100 may be any suitable electronic device such as, but not limited to, a mobile or smart phone, a phablet, a tablet, a laptop computer, portable media player, or any other suitable device which requires replenishment of energy, such as any suitable battery-equipped device, etc. In one embodiment, the energy source availability determining logic is implemented by a processor such as a CPU executing an operating system and the logic is implemented by the operating system. Thus, for ease of illustration and explanation, FIG. 1 shows the electronic device 100 as including an operating system with the energy source availability determining logic illustrated therein.

More particularly, as illustrated in FIG. 1, the electronic device 100 includes a processor subsystem 102, which includes a first processor 104 such as a CPU, a second processor 106 such as a graphics processing unit (GPU), a memory 108 such as an on-chip memory, and power management control logic 110. The power management control logic may include, for example, a system management unit (SMU) or power management unit (PMU). The first processor 104 is illustrated as including an operating system with energy source availability determining logic 112, and as including user activity/energy source availability-indicating applications 114 in communication with the operating system. The processor subsystem 102, and in this example the first processor 104, receives input from one or more energy source sensors 116.

The operating system with energy source availability determining logic 112 determines an availability (e.g., expected availability) of an energy source, such as a battery charger, to provide energy to the electronic device 100 as further described below. The operating system with energy source availability determining logic 112 then provides energy source availability information 118 to the power management control logic 110. The power management control logic 110, in turn, controls energy consumption of the electronic device 100 before the energy is provided to the electronic device 100 (e.g., by a battery charger) in response to the operating system with energy source availability determining logic 112 determining the availability to provide energy to the electronic device 100, where the availability may be indicated by the energy source availability information 118. In particular, the power management control logic 110 may communicate first processor power management control information 120 to the first processor 104 and second processor power management control information 122 to the second processor 106. The power management control logic 110 may also communicate additional power management control information 124 to an interface circuit 126 (e.g., a northbridge and/or a southbridge) to which the processor subsystem 102 is communicatively coupled in order to, for example, control power consumption of display logic that drives the output of a display. The power management control information 120, 122, and 124 may cause the first processor 104, the second processor 106, and additional components connected through the interface circuit 126 to adjust power consumption based on the availability to provide energy to the electronic device 100.

The interface circuit 126 may connect the processor subsystem 102 to an expansion bus 128, and the expansion bus 128 may further connect to, for example, a display 130; one or more peripheral devices 134; and an energy source receptacle 136 such as a port on the electronic device 100. The energy receptacle may be connected by way of a suitable plug 138 to an energy source 140 (e.g., battery charger). The expansion bus 128 may also connect to an additional memory 142 and one or more input/output (I/O) devices 144. The one or more I/O devices 144 may include, for example, one or more cellular transceivers such as a 3G or 4G transceiver; a Wi-Fi transceiver, a GPS receiver, a keypad, a touch screen, audio input/output devices, a stylus, and/or any other suitable input/output device(s).

In some embodiments, the processor subsystem 102 may be an accelerated processing unit (APU), which as known in the art includes one or more CPU cores and one or more GPU cores on the same die. Such an APU may be, for example, an APU as sold by Advanced Micro Devices, Inc. (AMD) of Sunnyvale, Calif. Alternatively, one or more of the first and second processors 104 and 106 may perform general-purpose computing on GPU (GPGPU), may include one or more digital signal processors (DSPs), one or more application-specific integrated circuits (ASICs), or the first and second processors 104 and 106 may be any suitable processors.

In some examples, the described energy source availability determining logic, and/or the power management control logic 110 and/or other logic described herein, may be implemented as software applications or "apps" by executing suitable instructions on, for example, the first processor 104 and/or the second processor 106. In other examples, the described energy source availability determining logic, and/or the power management control logic 110, and/or other logic described herein may be implemented by storing executable instructions on a computer readable storage medium, where the executable instructions are executable by one or more processors (e.g., the first processor 104 and/or the second processor 106) to cause the one or more processors to perform the actions described herein. For example, executable instructions may be stored in the memory 108, the additional memory 142, or any suitable memory as operating system with energy source availability determining logic code 146. The described energy source availability determining logic, and/or the power management control logic 110 and/or other logic described herein, may also be implemented in any other suitable manner such as but not limited to a hardware implementation or any suitable combination of the example implementations described above.

Figure 2:
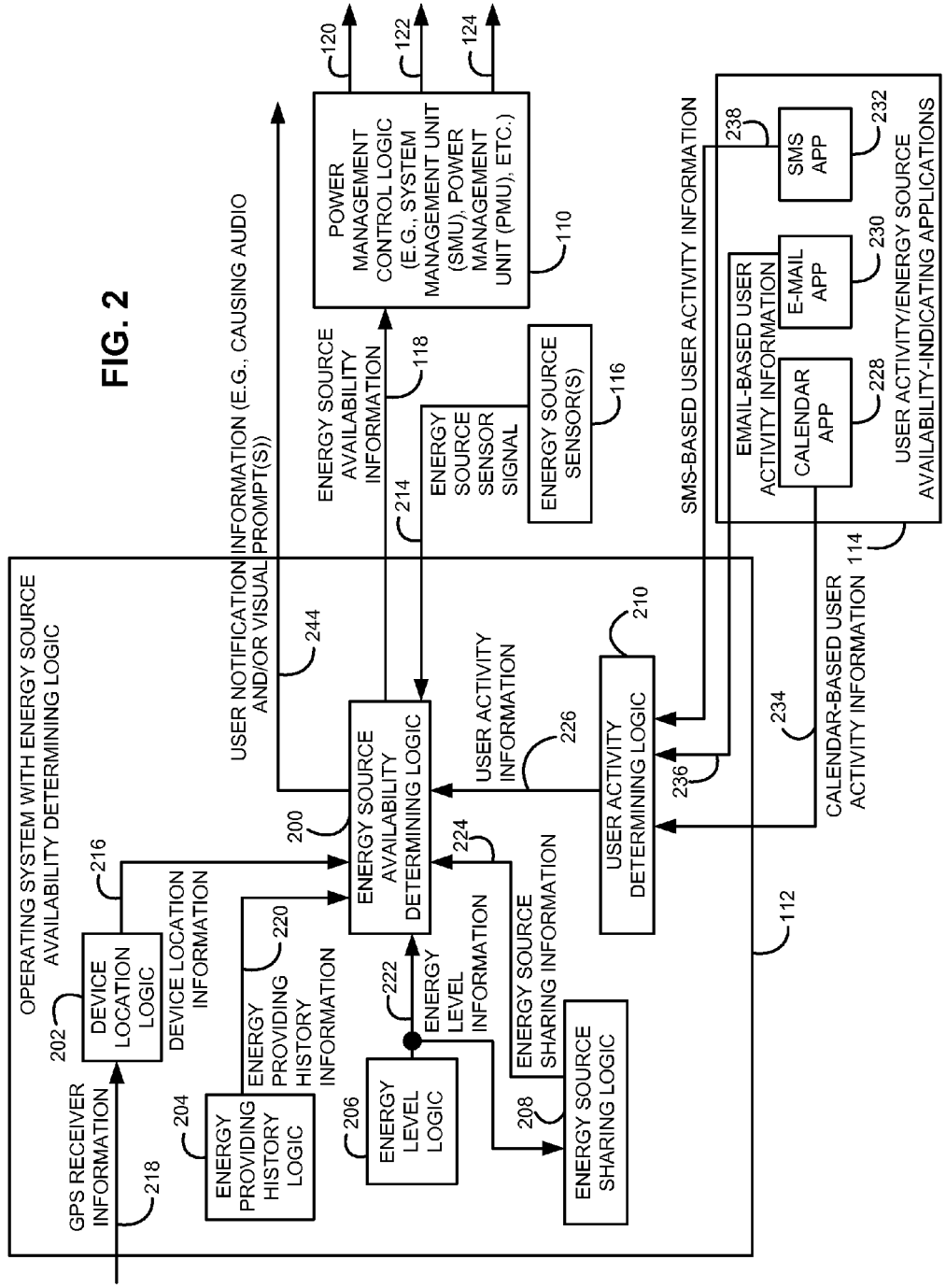
FIG. 2 is a functional block diagram illustrating an example of further detail of an operating system with energy source availability determining logic and other aspects of the example electronic device of FIG. 1.

FIG. 2 is a functional block diagram illustrating an example of further detail of the operating system with energy source availability determining logic 112, the user activity/energy source availability-indicating applications 114, and the power management control logic 110. Certain components of the example electronic device 100 of FIG. 1 are omitted from FIG. 2 for ease of illustration and explanation. The operating system with energy source availability determining logic 112 includes energy source availability determining logic 200, device location logic 202, energy providing history logic 204, energy level logic 206, energy source sharing logic 208, and user activity determining logic 210.

The energy source availability determining logic 200 may receive an energy source sensor signal 214 from the one or more energy source sensors 116. In particular, the one or more energy source sensors 116 may detect proximity to an energy source such as the energy source 140 (e.g., a battery charger) and may provide the energy source sensor signal 214 accordingly to indicate the detected proximity. The energy source availability determining logic 200 may also receive device location information 216 from the device location logic 202. The device location logic 202 may determine a current location of the device based on, for example, GPS receiver information 218 from a GPS receiver included in the one or more I/O devices 140. The device location information 216 may include the current location of the electronic device 100 and, in some cases, a history of previous locations of the electronic device 100.

The energy source availability determining logic 200 may also receive energy providing history information 220 from the energy providing history logic 204. The energy providing history information 220 may include, for example, a record of times at which the electronic device 100 received energy from the energy source 140 and, if desired, other energy sources. The energy source availability determining logic 200 may additionally receive energy level information 222 from the energy level logic 206 indicating, for example, a current energy level (e.g., percentage battery level) of the electronic device 100. Still further, the energy source availability determining logic 200 may receive energy source sharing information 224 from the energy source sharing logic 208, where the energy source sharing information 224 may include, for example, information regarding one or more additional electronic devices with which the electronic device 100 is to share access to the energy source 140 and an order in which the energy source 140 is to provide energy to the first electronic device 100 and the one or more additional electronic devices (not shown, but which may in some examples be configured similarly to the electronic device 100).

For example, the energy source sharing information 224 may include information indicative of a current energy level of a second electronic device, which information may be obtained from the second electronic device via, for example, a cellular network, the Internet and/or one or more cloud computing networks, etc. The energy source sharing information 224 may also include information as to which of the first electronic device 100 and the second electronic device is to manage sharing of the energy source 140. In any event, the electronic device with a lower current energy level may be permitted to use the energy source 140 first. Accordingly, for example, when the current energy level of the second electronic device is higher than a current energy level of the first electronic device 100, the energy source sharing information 224 may indicate this situation to the energy source availability determining logic 200.

The energy source availability determining logic 200 may then generate the energy source availability information 118 to include an indication that energy consumption of the electronic device 100 is to be controlled by the power management control logic 110 so that the first electronic device 100 consumes energy at a rate less than a rate at which the first electronic device 100 would otherwise (e.g., in the absence of the second electronic device sharing the energy source 140) consume energy before the energy is provided to the first electronic device by way of the energy source 140. When the second electronic device has finished using the energy source 140 (e.g., by reaching a particular percentage battery level), the energy source availability determining logic 200 may then generate the energy source availability information 118 by accounting for the energy source 140 no longer needing to be shared.

The energy source availability determining logic 200 may also receive user activity information 226 from the user activity determining logic 210. The user activity information 226 may be indicative of a predicted proximity of the electronic device 100 to the energy source 140 as determined based on predicted activity of a user of the electronic device 100. For example, the user activity determining logic 210 may generate the user activity information 226 based on information from the user activity/energy source availability-indicating applications 114. In one embodiment, the user activity/energy source availability-indicating applications 114 may include a calendar application or "app" 228, an e-mail app 230, and a Short Message Service (SMS) app 232. The user activity determining logic 210 may receive calendar-based user activity information 234; email-based user activity information 236; and SMS-based user activity information 238 from the apps 228, 230, and 232, respectively. The user activity determining logic 210 may analyze the information 234, 236, and 238 as further described below to provide the user activity information 226 to the energy source availability determining logic 200.

As discussed above, the energy level information 222 may additionally be provided to the energy source sharing logic 208 as shown in FIG. 2 so that the energy source sharing logic 208 may generate energy source sharing information 224 that accounts for the energy level of the first electronic device 100.

The energy source availability determining logic 200 may analyze one or more of the energy source sensor signal 214, the device location information 216, the energy providing history information 220, the energy level information 222, the energy source sharing information 224, and the user activity information 226 in any suitable manner in order to generate the energy source availability information 118. The energy source availability information 118 indicates the availability of an energy source (e.g., the energy source 140) to provide energy to the electronic device 100 based on, for example, the information analyzed by the energy source availability determining logic 200. It will be appreciated that, based on the information that may be analyzed to determine the energy source availability information 118, the availability to provide energy as indicated by the energy source availability information 118 may include an indication of how energy consumption of the electronic device 100 is to be controlled by the power management control logic 110.

Additionally, by analyzing one or more of the signals and/or information discussed above, the energy source availability determining logic 200 may also generate user notification information 244. As further discussed below, the user notification information 244 may cause, for example, the display 130 and/or one or more of the I/O devices 140 to issue an audio and/or visual prompt(s) to the user of the electronic device 100 to, for example, provide energy to the electronic device 100.

Figure 3:
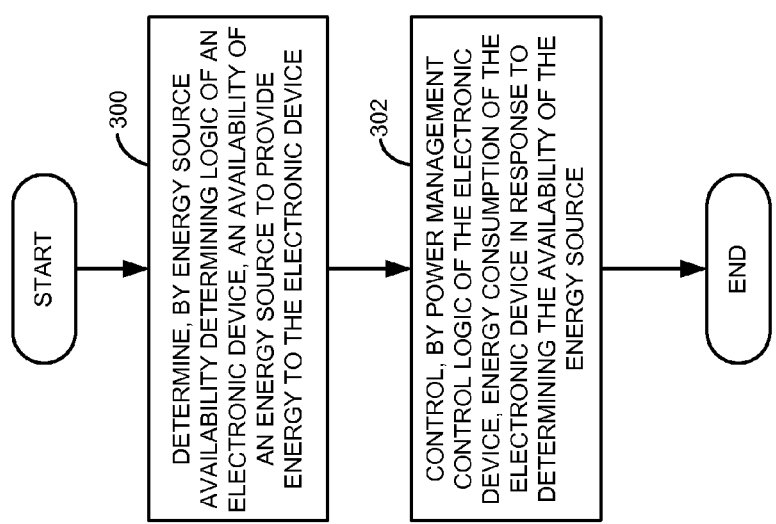
FIG. 3 is a flowchart of an example method for controlling energy consumption of an electronic device.

With continued reference to FIG. 2 and turning also to FIG. 3, FIG. 3 is a flowchart of an example method for controlling energy consumption of an electronic device. The method illustrated in FIG. 3, and each of the example methods described herein, may be carried out by one or more suitably programmed controllers or processors executing software (e.g., by the first processor 104 executing the operating system with energy source availability determining logic 112 and by the power management control logic 110 when the power management control logic 110 is implemented as a controller or processor executing software). The method may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 3), it will be appreciated that many other ways of performing the acts associated with the method(s) may be used. For example, the order of some operations may be changed, and some of the operations described may be optional. Additionally, while the method(s) may be described with reference to the electronic device 100, it will be appreciated that the method(s) may be implemented by other devices as well, and that the electronic device 100 may implement other methods.

As shown in FIG. 3, the method begins at block 300 when energy source availability determining logic, such as logic included in an operating system as discussed with reference to FIGS. 1 and 2, determines an availability of an energy source, such as the energy source 140, to provide energy to an electronic device, such as to the electronic device 100 by way of the energy source receptacle 136 and the plug 138.

As shown in block 302, power management control logic of the electronic device, such as the power management control logic 110, then controls energy consumption of the electronic device 100 in response to determining the availability of the energy source (e.g., in response to the determination in block 300).

Figure 4:
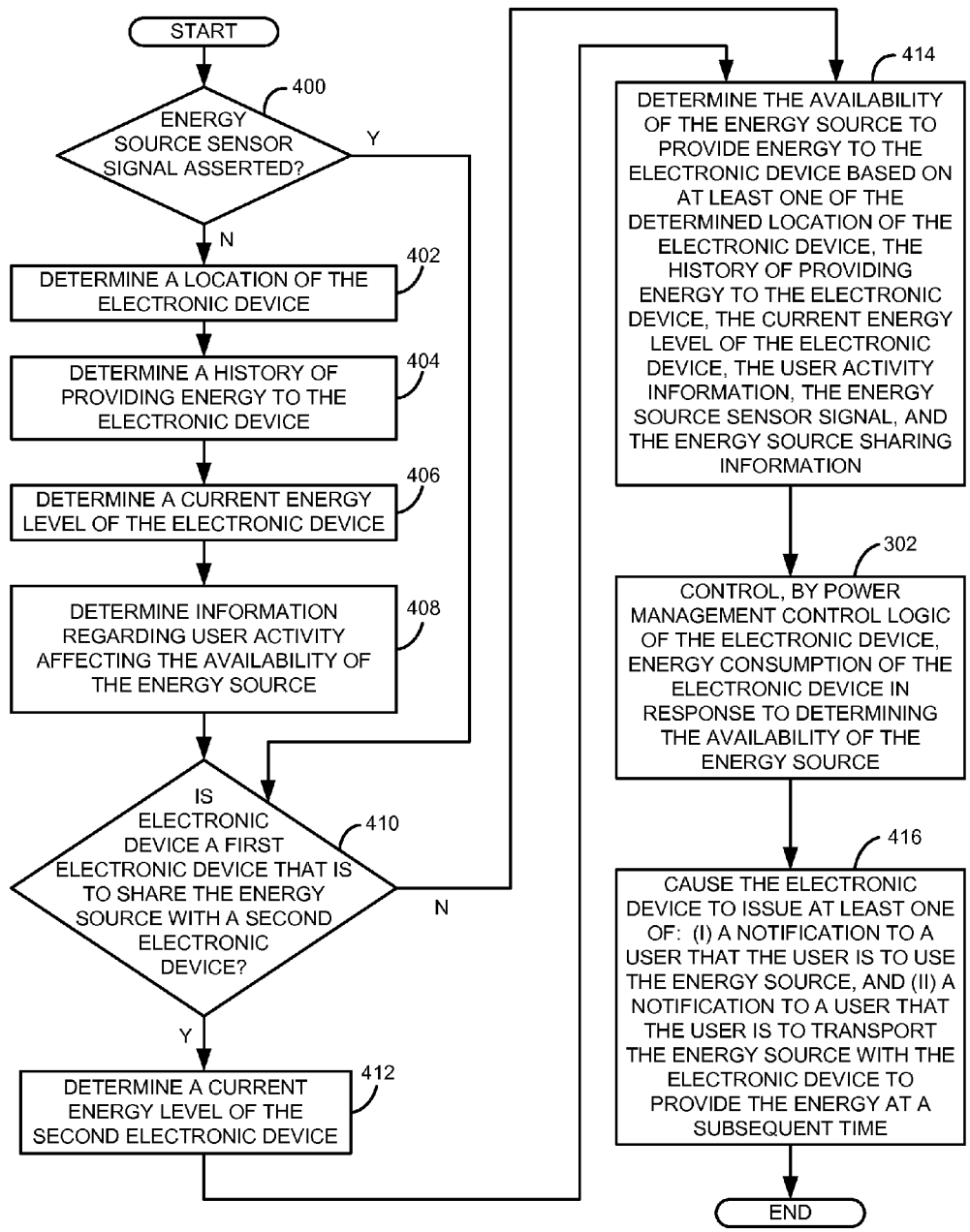
FIG. 4 is a flowchart of an example method for controlling energy consumption of an electronic device and includes aspects of the method illustrated in FIG. 3 in more detail.

With reference to FIG. 4, FIG. 4 is a flowchart of another example method for controlling energy consumption of an electronic device and includes aspects of the method illustrated in FIG. 3 in more detail. As shown in block 400, the method may include determining whether the energy source sensor signal 214 is asserted, which may indicate that the energy source sensor(s) 116 have detected proximity to the energy source 140. If the energy source sensor signal 214 is not asserted, flow may proceed to block 402. If the energy source sensor signal is asserted, flow may proceed to block 410.

As shown in block 402, the method may include determining a location of the electronic device 100, such as by the device location logic 202 analyzing the GPS receiver information 218 to determine the device location information 216. The actions described with respect to block 402 may also include, for example, determining how often and/or particular times at which the electronic device 100 has previously been at the determined location. As another example, the actions described with respect to block 402 may also include utilizing map data obtained based on analyzing the GPS receiver information 218 to determine whether the location of the electronic device 100 is within a residence or other area in which the electronic device 100 is expected to have greater (or lesser, depending upon the detected location in conjunction with the map data) access to an energy source such as the energy source 140.

In some examples, the actions described with respect to block 402 may also or alternatively include analyzing the GPS receiver information 218 to determine one or more travel parameters of the electronic device 100, such as, for example, a current direction in which the electronic device 100 is traveling and a current speed at which the electronic device 100 is traveling. Additionally, in some examples, the actions described with respect to block 402 may include analyzing information regarding a known location of an energy source, such as the energy source 140 (e.g., information regarding a location at which the electronic device 100 was previously plugged into the energy source 140 or previously detected the energy source 140 using the energy source sensor(s) 116). The information regarding the known location of the energy source may be analyzed in conjunction with the determined travel parameter(s) of the electronic device 100 to predict when the electronic device 100 is expected to be in proximity to the energy source 140 (e.g., close enough to receive energy from the energy source 140 immediately or within a small amount of time, such as on the order of, for example, tens of seconds needed to connect the energy source receptacle 136 to the energy source 140).

In another example, the actions described with respect to block 402 may include determining that the location of the electronic device 100 already corresponds to the known location of the energy source 140 (e.g., is already in proximity to the energy source 140) so that the electronic device 100 can receive energy from the energy source 140 immediately or within a small amount of time as discussed above. These determinations may be used in eventually determining the expected availability of the energy source 140 to provide energy to the electronic device 100.

As shown in block 404, the method may further include determining a history of providing energy to the electronic device 100. For example, the energy source availability determining logic 200 may obtain the energy providing history information 220 from the energy providing history logic 204. As noted above, the energy providing history information 220 may include a record of times at which the electronic device 100 received energy from the energy source 140 to be used in the eventual determination (e.g., prediction) of the expected availability of the energy source 140. In some examples, the energy source availability determining logic 200 may utilize the energy providing history information 220 in combination with the device location information 216, such as in combination with particular times at which the electronic device 100 has previously been at the determined location of the electronic device 100, to predict a proximity of the electronic device 100 to the energy source 140 at a particular time.

Determining the history of providing energy to the electronic device 100 may also include determining or maintaining a record of times at which the electronic device 100 received energy from other energy sources (not shown), e.g., energy sources other than the energy source 140. The energy source availability determining logic 200 may then utilize the energy providing history information 220, which may include these additional records, in combination with the device location information 216 to predict a proximity of the electronic device 100 to any of a plurality of energy sources at a particular time.

As shown in block 406, the method may further include determining a current energy level of the electronic device 100. For example, the energy level logic 206 may provide the energy level information 222, which may be information indicating a level of charge of a battery of the electronic device 100, to the energy source availability determining logic 200.

As shown in block 408, the method may further include determining (e.g., predicting) information regarding user activity affecting the availability of the energy source. For example, the user activity determining logic 210 may provide the user activity information 226 to the energy source availability determining logic 200.

From block 408, flow may proceed to block 410. As noted above with respect to block 400, if it is determined that the energy source sensor signal 214 is asserted, flow may also proceed to block 410. As shown in block 410, the method may include determining whether the electronic device 100 is a first electronic device that is to share the energy source 140 with a second electronic device. For example, the electronic device 100 may receive a signal periodically transmitted from a second electronic device indicating that the second electronic device needs to receive energy from the same energy source (e.g., the energy source 140) as an energy source indicated by the location of the first electronic device (e.g., as determined using the GPS receiver information 218).

In such a situation, it is determined in block 410 that the electronic device 100 is a first electronic device that is to share the energy source 140 with a second electronic device, and flow proceeds to block 412. If it is determined in block 410 that the electronic device 100 is not a first electronic device that is to share the energy source 140 with a second electronic device, flow proceeds to block 414. It will be appreciated that additional electronic devices may also transit similar information indicating a need to receive energy from a nearby energy source and that additional electronic devices may also share the energy source 140 with the first electronic device 100.

As shown in block 412, the method may include determining a current energy level of the second electronic device. In some embodiments, the energy source sharing information 224 may reflect the current energy level of the second electronic device, as discussed above.

As shown in block 414, the method may include determining the availability (e.g., expected availability) of the energy source 140 to provide energy to the electronic device 100 based on at least one of the determined location of the electronic device 100, the history of providing energy to the electronic device 100, the current energy level of the electronic device 100, the user activity information 226 indicative of a predicted proximity of the electronic device 100 to the energy source as determined based on predicted activity of a user of the electronic device 100, the energy source sensor signal 214 when applicable, and when applicable (e.g., when it is determined in block 410 that the electronic device 100 is to share the energy source 140), the energy source sharing information 224. Because flow may proceed from block 400 to block 410 when the energy source sensor signal 214 is asserted, determining the availability (e.g., expected availability) of the energy source 140 to provide energy to the electronic device 100 may, if desired, be more narrowly based on sensor-detected proximity to the energy source 140 and considerations such as the energy source sensor signal 214 and, when applicable, sharing of the energy source 140 with a second electronic device (e.g., block 410) and the current energy level of the second electronic device (e.g., block 412).

As shown in block 302 and as discussed with reference to FIG. 3, the method may also include controlling, by the power management control logic 110, energy consumption of the electronic device 100 in response to determining the availability of the energy source 140.

For example, the expected availability to provide energy to the electronic device 100 may indicate that energy consumption is to be controlled so that the electronic device 100 consumes energy at a rate greater than a rate at which the electronic device 100 is otherwise (e.g., without having determined the expected availability to provide energy to the electronic device 100 as described herein) configured to consume energy when energy consumption is to be reduced. For example, the electronic device 100 may otherwise be configured to reduce its rate of energy consumption by a certain amount when an amount of battery charge remaining reaches, for example, 20 percent of the capacity of the battery. However, the expected availability to provide energy to the electronic device 100 may indicate in this example situation that the rate of energy consumption of the electronic device 100 can be reduced by a lesser amount and/or more gradually as compared to a manner in which the electronic device 100 is otherwise configured to reduce the rate of its energy consumption.

In some cases, the expected availability to provide energy to the electronic device 100 may indicate that the rate of energy consumption of the electronic device 100 can be maintained or even increased if, for example, applications currently executing on the electronic device 100 require increased energy consumption for optimal performance and the expected availability to provide energy indicates that maintaining or increasing the rate of energy consumption will not cause the battery charge to run out before the electronic device 100 is expected to be able to be connected to the energy source 140.

In the foregoing situations, the energy source availability information 118 may indicate to the power management control logic 110 that the rate of energy consumption may be reduced by a lesser amount and/or more gradually, maintained, or increased, as the case may be, and the power management control logic 110 may generate the power management control information 120, 122, and 124 accordingly.

With continued reference to block 302, in other situations, the expected availability to provide energy to the electronic device 100 may indicate that energy consumption is to be controlled so that the electronic device 100 consumes energy at a rate less than the rate at which the electronic device 100 is otherwise configured to consume energy when energy consumption is to be reduced, and/or so that the electronic device 100 reduces its rate of energy consumption sooner than the electronic device 100 is otherwise configured to do so. For example, the expected availability to provide energy may indicate that, even with the configured reduction in the rate of energy consumption, energy will not be able to be provided to the electronic device 100 before the battery charge runs out (e.g., based on the user activity information 226 or any suitable input to the energy source availability determining logic 200).

In this situation, the energy source availability information 118 may indicate to the power management control logic 110 that the rate of energy consumption is to be reduced by a greater amount, and/or sooner, than an amount and/or time by or at which the electronic device 100 is otherwise configured to reduce energy consumption. The power management control logic 110 may then generate the power management control information 120, 122, and 124 accordingly.

As shown in block 416, the method may also include causing the electronic device 100 to issue at least one of: (i) a notification to a user of the electronic device 100 that the user is to use an energy source (e.g., the energy source 140) to provide the energy to the electronic device 100, and (ii) a notification to a user of the electronic device 100 that the user is to transport an energy source (e.g., the energy source 140), and in some examples the plug 138, with the electronic device 100 to provide the energy to the electronic device 100 at a subsequent time. For example, the energy source availability determining logic 200 may generate user notification information 244 to cause audio or visual prompts based on the expected availability to provide energy to the electronic device 100, thereby causing, for example, the display 130 and or one or more of the I/O devices 140 to issue an audio and/or visual notification(s) to the user. More particularly, a notification that the user is to use the energy source 140 or is to transport the energy source 140 to provide the energy at a subsequent time may be based on, for example, the user activity information 226 which may be indicative of a future location of the electronic device 100 as predicted based on predicted activity of a user of the electronic device 100.

Figure 5:
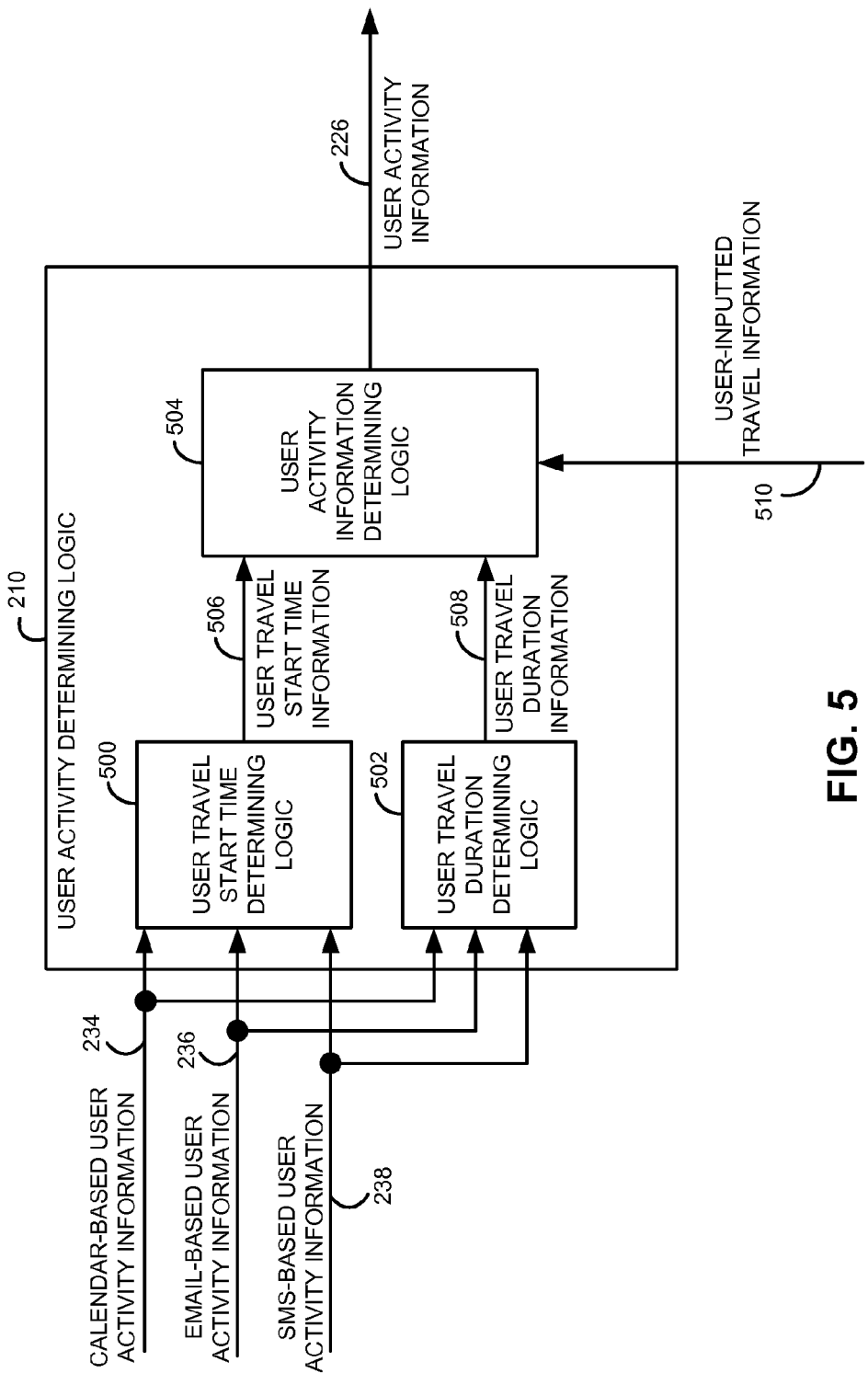
FIG. 5 is a functional block diagram illustrating an example implementation of user activity determining logic of the example electronic device of FIG. 1.

FIG. 5 is a functional block diagram illustrating an example implementation of the user activity determining logic 210. The user activity determining logic 210 may include user travel start time determining logic 500, user travel duration determining logic 502, and user activity information determining logic 504. As shown in FIG. 5, each of the user travel start time determining logic 500 and the user travel duration determining logic 502 may receive the calendar-based user activity information 234, the email-based user activity information 236, and the SMS-based user activity information 238, which may include information regarding the contents of calendar appointments, e-mail messages, and SMS messages, respectively.

The user travel start time determining logic 500 may include any suitable logic to analyze contents of, for example, calendar appointments on the calendar application 228 as indicated in the calendar-based user activity information 234, and/or similar e-mail and SMS items as indicated in the information 236 and 238, respectively, to determine a user travel start time. For example, the user travel start time determining logic 500 may scan calendar appointments to determine the start time of the appointments, and/or may scan e-mail and SMS items for key words and/or phrases such as "meet at" and/or, for example, the words "meet" and "at" within a particular (e.g., configurable) number of words of one another. The user travel start time determining logic 500 may then scan the e-mail and SMS items for an associated time to determine the user travel start time.

Of course, key words synonymous with "meet" and "at" may also be searched, and the user travel start time determining logic 500 may also or alternatively be configured to scan the calendar-based user activity information 234, the email-based user activity information 236, and the SMS-based user activity information 238 in any other suitable manner. The user travel start time determining logic 500 may generate user travel start time information 506 indicating a determined (e.g., predicted) start time of travel of a user of the electronic device 100 and may provide the user travel start time information 506 to the user activity information determining logic 504.

The user travel duration determining logic 502 may include any suitable logic to analyze contents of, for example, calendar appointments on the calendar application 228 as indicated in the calendar-based user activity information 234, and/or similar e-mail and SMS items as indicated in the information 236 and 238, respectively, to determine a user travel start duration. For example, the user travel duration determining logic 502 may scan calendar appointments to determine the length of appointments, and/or may scan e-mail and SMS items for key words and/or phrases indicating a length of travel of a user. As just one example, the user travel duration determining logic 502 may scan e-mail and SMS items for information such as a flight departure and flight arrival time indicated in an e-mailed itinerary, an amount of time between two particular times included in an e-mail or SMS item with a nearby keyword such as "from" suggesting that the particular times are a start time and an end time of an event, etc.

The user travel duration determining logic 502 may also or alternatively be configured to scan the calendar-based user activity information 234, the email-based user activity information 236, and the SMS-based user activity information 238 in any other suitable manner. The user travel duration determining logic 502 may generate user travel duration information 508 indicating a determined (e.g., predicted) duration of travel of a user of the electronic device 100 and may provide the user travel duration information 508 to the user activity information determining logic 504.

The user activity information determining logic 504 may then analyze the user travel start time information 506 and the user travel duration information 508 to determine the user activity information 226. In this manner, proceeding under the assumption that the user will bring the electronic device 100 with him or her during travel, the user activity information 226 may indicate a predicted proximity of the electronic device 100 to the energy source 140 as determined based on predicted activity of the user. For example, the user activity information 226 may indicate that the electronic device 100 is predicted to be at a location away from the energy source 140 starting at a time indicated by the user travel start time information 506 and extending for a duration indicated by the user travel duration information 508 unless the user transports the energy source 140 with the electronic device 100 during travel.

In some embodiments, the user activity information determining logic 504 may receive user-inputted travel information 510. Where the user-inputted travel information 510 specifies the travel start time and/or duration, the user-inputted travel information 510 may override the user travel start time information 506 and/or the user travel duration information 508 accordingly in the analysis by the user activity information determining logic 508.

Figure 6:
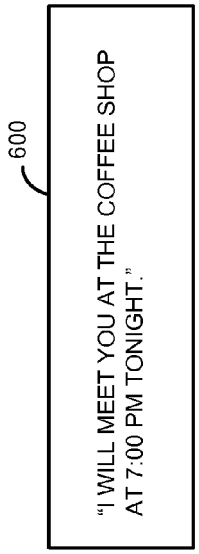
FIG. 6 shows the text of an example SMS message which may be received by the electronic device and analyzed by the example user activity determining logic of FIG. 5.
Figure 7:
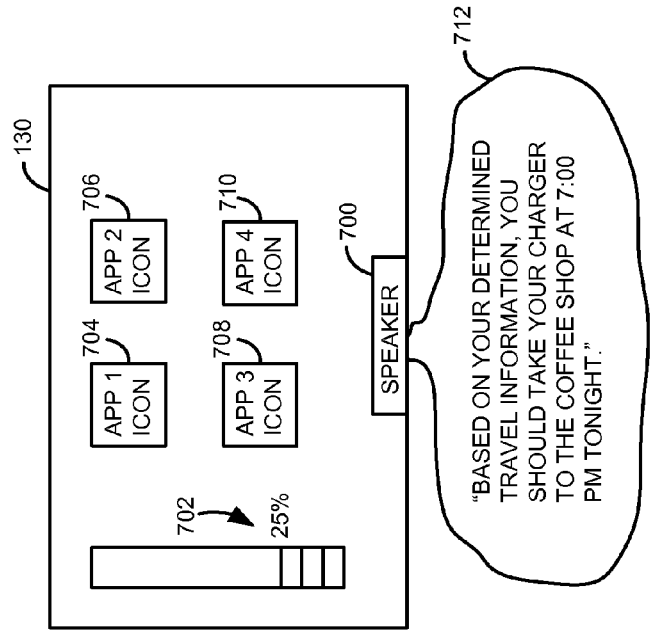
FIG. 7 illustrates an example of a simplified front view of the electronic device, including a view of a display and a speaker that issues a notification to a user of the electronic device based on the electronic device receiving the example SMS message of FIG. 6.

FIG. 6 shows the text of an example SMS message 600 which may be received by the electronic device 100 and analyzed by the user activity determining logic 210. The example SMS message 600 reads "I will meet you at the coffee shop at 7:00 pm tonight." FIG. 7 illustrates an example of a simplified front view of the electronic device, including a view of the display 130 and a speaker 700 that, as discussed below, issues a notification to a user of the electronic device 100 based on the electronic device 100 receiving the SMS message 600 of FIG. 6. The speaker 700 may be one of the I/O devices 144 shown and described with respect to FIG. 1.

As illustrated in FIG. 7, the display 130 shows a battery level icon 702 indicating that approximately 25 percent battery charge remains. The display 130 also shows icons that may be used to access various applications ("apps") executing or executable on the electronic device 100. For example, the display 130 may show a first application icon 704 for a first app, a second application icon 706 for a second app, a third application icon 708 for a third app, and a fourth application icon 710 for a fourth app.

As shown in FIG. 7, the speaker 700 issues a notification in the form of an audio prompt 712 to a user of the electronic device, where the audio prompt 712 may include an audio message saying "Based on your determined travel information, you should take your charger to the coffee shop at 7:00 pm tonight." In this example, the user travel duration determining logic 502 in the example of FIG. 5 may be configured to analyze the SMS message 600 and infer from the key words "coffee shop" that the duration of travel will be at least several hours. The user activity determining logic 210 may then generate the user activity information 226. The energy source availability determining logic 200 may generate the user notification information 244 to cause issuance of the audio prompt 712 based on, for example, the user activity information and the energy level information 222. For example, the energy source availability determining logic 200 may determine that the user activity information 226 indicates a prediction that the electronic device 100 will be away from the energy source 140 for a sufficiently long time based on the energy level information 222 (indicating the approximately 25 percent battery level) that the electronic device 100 will run out of energy unless the user takes the energy source 140 (e.g., battery charger) with him or her to the coffee shop.

Among other advantages, for example, one or more of the above embodiments allow a way to determine an expected availability of an energy source to provide energy to an electronic device, and control energy consumption of the electronic device in response to determining the expected availability of the energy source. The expected availability of the energy source to provide energy to the electronic device may be based on any of one or more suitable and/or desired factors, such as information regarding a location of the electronic device, information regarding a history of providing energy to the electronic device, current energy level information regarding the electronic device, information regarding sharing of the energy source between the electronic device and another electronic device or devices, an energy source sensor signal, and user activity information, for example. Other advantages will be recognized by those of ordinary skill in the art.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for controlling energy consumption of an electronic device, the method comprising:
   determining, by energy source availability determining logic of the electronic device, an availability of an energy source to provide energy to the electronic device; and
   controlling, by power management control logic of the electronic device, energy consumption of the electronic device in response to determining the availability of the energy source, wherein the electronic device is a first electronic device, wherein the method comprises determining a current energy level of a second electronic device to which the energy source is to provide energy, and wherein determining the availability of the energy source to provide energy to the first electronic device is based on the current energy level of the second electronic device, wherein determining the availability of the energy source to provide energy to the electronic device comprises:
   determining a location of the second electronic device; and
   determining the availability of the energy source based on the determined location of the second electronic device.

2. The method of claim 1, wherein determining the availability of the energy source to provide energy to the electronic device comprises:
   determining a location of the electronic device; and
   determining the availability of the energy source based on the determined location of the electronic device.

3. The method of claim 1, wherein determining the availability of the energy source comprises determining the availability based on at least one of: (i) user activity information indicative of a predicted proximity of the electronic device to the energy source as determined based on predicted activity of a user of the electronic device, and (ii) sharing information regarding sharing of the energy source between the first electronic device and the second electronic device.

4. The method of claim 1, wherein when the current energy level of the second electronic device is higher than a current energy level of the first electronic device, controlling the energy consumption of the first electronic device comprises controlling the first electronic device to consume energy at a rate less than a rate at which the first electronic device would otherwise consume energy before the energy is provided to the first electronic device.

5. The method of claim 1, wherein controlling the energy consumption of the electronic device in response to determining the availability of the energy source comprises at least one of: (i) controlling the electronic device to consume energy at a rate greater than a rate at which the electronic device is otherwise configured to consume energy when energy consumption of the electronic device is to be reduced, and (ii) controlling the electronic device to consume energy at a rate less than the rate at which the electronic device is otherwise configured to consume energy when energy consumption of the electronic device is to be reduced.

6. The method of claim 1, comprising issuing at least one of: (i) a notification to a user of the electronic device that the user is to use the energy source to provide the energy to the electronic device, and (ii) a notification to a user of the electronic device that the user is to transport the energy source with the electronic device to provide the energy to the electronic device at a subsequent time.

7. An apparatus for controlling energy consumption of an electronic device, the apparatus comprising:
   energy source availability determining logic operative to determine an availability of an energy source to provide energy to the electronic device; and
   power management control logic operative to control energy consumption of the electronic device in response to the energy source availability determining logic determining the availability of the energy source, wherein the electronic device is a first electronic device, wherein the energy source availability determining logic is operative to determine a current energy level of a second electronic device to which the energy source is to provide energy, and wherein determining the availability of the energy source to provide energy to the first electronic device is based on the current energy level of the second electronic device, wherein the energy source availability determining logic is operative to:
   determine a location of the second electronic device; and
   determine the availability of the energy source based on the determined location of the second electronic device.

8. The apparatus of claim 7, wherein the energy source availability determining logic is operative to:
   determine a location of the electronic device; and
   determine the availability of the energy source based on the determined location of the electronic device.

9. The apparatus of claim 7, wherein the energy source availability determining logic is operative to:
   predict a proximity of the electronic device to the energy source at a particular time; and
   determine the availability of the energy source based on the predicted proximity of the electronic device to the energy source at the particular time.

10. The apparatus of claim 9, wherein the power management control logic is operative to control the energy consumption of the electronic device in response to the energy source availability determining logic determining the availability of the energy source by at least one of: (i) controlling the electronic device to consume energy at a rate greater than a rate at which the electronic device is otherwise configured to consume energy when energy consumption of the electronic device is to be reduced, and (ii) controlling the electronic device to consume energy at a rate less than the rate at which the electronic device is otherwise configured to consume energy when energy consumption of the electronic device is to be reduced.

11. The apparatus of claim 7 operable to receive an indication of a detected proximity to the energy source, wherein the energy source availability determining logic is operative to determine the availability of the energy source based on the received indication of the detected proximity to the energy source.

12. The apparatus of claim 7, wherein the energy source availability determining logic is comprised of a processor and memory containing executable instructions that, when executed by the processor, cause the processor to determine the availability of the energy source to provide energy to the electronic device.

13. The apparatus of claim 7, comprising at least one of an accelerated processing unit (APU), a central processing unit (CPU), a graphics processing unit (GPU), and display logic operatively coupled to a display, wherein the power management control logic is operative to control the energy consumption of the electronic device in response to the energy source availability determining logic determining the availability of the energy source by controlling energy consumption of one or more of the at least one of the APU, the CPU, the GPU, and the display logic.

14. A non-transitory computer readable storage medium comprising executable instructions that when executed by one or more processors cause the one or more processors to:
   determine an availability of an energy source to provide energy to an electronic device;
   determine a current energy level of a second electronic device to which the energy source is to provide energy; and
   provide energy source availability information indicative of the availability of an energy source to power management control logic of the electronic device whereby an energy consumption of the electronic device is controlled in response to the one or more processors determining the availability of the energy source, wherein the electronic device is a first electronic device, and wherein determining the availability of the energy source to provide energy to the first electronic device is based on the current energy level of the second electronic device, wherein determining the availability of the energy source to provide energy to the electronic device comprises:
   determining a location of the second electronic device; and
   determining the availability of the energy source based on the determined location of the second electronic device.

15. The non-transitory computer readable storage medium of claim 14, comprising executable instructions that when executed by the one or more processors cause the one or more processors to:
   determine at least one of a location of the electronic device and a history of providing energy to the electronic device; and
   determine the availability of the energy source based on the at least one of the determined location of the electronic device and the determined history of providing energy to the electronic device.

16. The non-transitory computer readable storage medium of claim 14, comprising executable instructions that when executed by the one or more processors cause the one or more processors to determine the availability of the energy source based on at least one of: (i) user activity information indicative of a predicted proximity of the electronic device to the energy source as determined based on predicted activity of a user of the electronic device, and (ii) sharing information regarding sharing of the energy source between the first electronic device and the second electronic device.

17. The non-transitory computer readable storage medium of claim 14, comprising executable instructions that when executed by the one or more processors cause the one or more processors to:
- obtain information from the second electronic device indicative of a current energy level of the second electronic device; and
- determine an order in which the energy source is to provide energy to the first electronic device and the second electronic device based on a current energy level of the first electronic device and the current energy level of the second electronic device.

18. The non-transitory computer readable storage medium of claim 14, comprising executable instructions that when executed by the one or more processors cause the one or more processors to cause the electronic device to issue at least one of: (i) a notification to a user of the electronic device that the user is to use the energy source to provide the energy to the electronic device, and (ii) a notification to a user of the electronic device that the user is to transport the energy source with the electronic device to provide the energy to the electronic device at a subsequent time.

19. The non-transitory computer readable storage medium of claim 14, comprising executable instructions that when executed by the one or more processors cause the one or more processors to:
- detect proximity to the energy source based on a signal from an energy source sensor of the electronic device; and
- determine the availability of the energy source based on the detected proximity to the energy source.

* * * * *